United States Patent
Gebhard et al.

(10) Patent No.: US 7,900,151 B2
(45) Date of Patent: Mar. 1, 2011

(54) MAINTAINING INDIVIDUAL OBJECT DATA

(75) Inventors: Gerhard Gebhard, Wiesloch (DE); Christiane Kuntz-Mayr, Limburgerhof (DE); Steffen Horndacher, Wiesloch (DE)

(73) Assignee: SAP AG, Walldorf (DE)

( * ) Notice: Subject to any disclaimer, the term of this patent is extended or adjusted under 35 U.S.C. 154(b) by 647 days.

(21) Appl. No.: 11/033,054

(22) Filed: Jan. 10, 2005

(65) Prior Publication Data

US 2005/0197852 A1 Sep. 8, 2005

Related U.S. Application Data

(60) Provisional application No. 60/550,057, filed on Mar. 5, 2004.

(51) Int. Cl.
G06F 3/048 (2006.01)

(52) U.S. Cl. ...................................................... 715/764

(58) Field of Classification Search ................ 715/825, 715/810, 770, 764; 705/1
See application file for complete search history.

(56) References Cited

U.S. PATENT DOCUMENTS

| | | | | |
|---|---|---|---|---|
| 5,601,432 A * | 2/1997 | Bergman | ..................... | 434/118 |
| 5,714,971 A | 2/1998 | Shalit et al. | | |
| 5,923,845 A * | 7/1999 | Kamiya et al. | .............. | 709/206 |
| 6,100,873 A * | 8/2000 | Bayless et al. | .............. | 345/593 |
| 6,237,051 B1 | 5/2001 | Collins | | |
| 6,330,007 B1 | 12/2001 | Isreal et al. | | |
| 6,349,404 B1 | 2/2002 | Moore et al. | | |
| 6,380,954 B1 * | 4/2002 | Gunther | ...................... | 715/764 |
| 6,418,361 B2 * | 7/2002 | Sinex | .......................... | 701/29 |
| 6,442,459 B1 | 8/2002 | Sinex | | |
| 6,560,639 B1 | 5/2003 | Dan et al. | | |
| 6,587,127 B1 * | 7/2003 | Leeke et al. | ................. | 715/765 |
| 6,650,346 B1 | 11/2003 | Jaeger et al. | | |
| 6,912,690 B2 * | 6/2005 | Bauchot | ...................... | 715/220 |
| 6,978,273 B1 | 12/2005 | Bonneau et al. | | |
| 7,047,522 B1 | 5/2006 | Dixon et al. | | |
| 7,308,410 B2 * | 12/2007 | Bowe et al. | ..................... | 705/1 |
| 2002/0126148 A1 * | 9/2002 | Rosenkranz et al. | ........ | 345/764 |
| 2002/0186254 A1 | 12/2002 | Monbaron | | |
| 2002/0188486 A1 | 12/2002 | Gil et al. | | |
| 2003/0030671 A1 * | 2/2003 | Cobb et al. | ................. | 345/764 |
| 2003/0048301 A1 * | 3/2003 | Menninger | .................. | 345/764 |

(Continued)

OTHER PUBLICATIONS

European Search Report.

*Primary Examiner*—Weilun Lo
*Assistant Examiner*—Enrique W Iturralde
(74) *Attorney, Agent, or Firm*—Fish & Richardson P.C.

(57) ABSTRACT

A tool and graphical user interface (GUI) may be provided for a customer relationship management (CRM) system that enables a user to create, maintain, display and use individual object (iObject) data that relates to a unique asset in a family of assets. A tool or GUI for maintaining information that relates to individual objects may be referred to herein as an "individual object workbench" (workbench). In general, a workbench may include a selection area for selecting an individual object to be defined, and a definition area in which a user may define information to be associated with the selected individual object. Each individual object may be associated with a unique identifier (e.g., a particular car is associated with a vehicle identification number) as a consistent identifier of an individual asset throughout that asset's lifecycle, which may span multiple owners, for example.

20 Claims, 10 Drawing Sheets

U.S. PATENT DOCUMENTS

| | | |
|---|---|---|
| 2003/0050813 A1 | 3/2003 | Cohen et al. |
| 2003/0095145 A1* | 5/2003 | Patrizio et al. ............... 345/764 |
| 2003/0195789 A1 | 10/2003 | Yen |
| 2003/0229631 A1 | 12/2003 | Arend et al. |
| 2003/0229646 A1 | 12/2003 | Bach et al. |
| 2004/0012633 A1* | 1/2004 | Helt ........................... 345/764 |
| 2004/0104939 A1* | 6/2004 | Locke et al. ................ 345/764 |
| 2004/0139104 A1 | 7/2004 | Kuntz-Mayr et al. |
| 2006/0095835 A1* | 5/2006 | Kennedy et al. ............ 715/513 |
| 2007/0168880 A1* | 7/2007 | Hoberman ................... 715/810 |
| 2007/0186175 A1* | 8/2007 | Hudson ....................... 715/764 |
| 2007/0192715 A1* | 8/2007 | Kataria et al. ............... 715/764 |
| 2007/0214031 A1 | 9/2007 | Amano |
| 2007/0250784 A1* | 10/2007 | Riley et al. .................. 715/764 |

* cited by examiner

MAINTAINING INDIVIDUAL OBJECT DATA

CROSS REFERENCE TO RELATED APPLICATIONS

This application claims priority from U.S. Provisional Application. No. 60/550,057, filed Mar. 5, 2004, and titled "Individual Object Workbench," which is incorporated by reference in its entirety.

TECHNICAL FIELD

This invention relates to a graphical user interface for defining master data that are structured as individual data objects wherein each such object uniquely defines a single asset.

BACKGROUND

Customer relationship management (CRM) systems are designed to track relationships between a business and its customers (which may be referred to as a type of business partner), as well as the services or assets (such as software, contracts, or property) that form these relationships. Assets are typically tracked through records representing business partners that have relationships to certain assets. This is the case because CRM systems are designed to focus primarily on customers, or business partners. Additionally, records of these assets are sometimes kept in a tabular format, with a single unique identifier. This makes it difficult, in some cases, to reflect accurately a particular asset's relationships with customers and other products, or its configuration as it differs from other assets of the same family, especially as this information changes with time.

Maintenance of data consistency between different aspects of a comprehensive CRM system (such as aspects of service, marketing, and sales) that relate to the same services or assets can become increasingly complex as additional systems are used for transactions with the same service or asset, especially where different systems use different records to represent the same particular service or asset. Transactions and other events in CRM systems are typically initiated by determining the type of transaction desired. Parameters (such as customer, cost and time) are set, and then a suitable service or asset of the transaction must be found and selected, after which the appropriate modifications must be made to all of the various records that can represent the service or asset.

A shortcoming of CRM and other similar systems is that tracking individual assets can become difficult in industries where assets are high-valued and have long life spans. In these areas, assets often become increasingly unique with the passage of time. Some CRM systems use product master data for representing assets, wherein a single generic record of master data is used to list all of the components and characteristics of all assets of a particular type. Existing systems are also oriented toward relationships with customers or other business partners, and not towards relationships with assets. Thus, in some cases, it is awkward for such systems to accurately reflect individual assets as they become more and more unique.

Similarly, the meaning of a business transaction is typically fixed by existing CRM applications, and the reuse of master data information, such as material or service "products" a company sells or provides, further limits the ability to customize a transaction to unique situations.

SUMMARY

A tool and graphical user interface (GUI) may be provided for a customer relationship management (CRM) system that enables a user to create, maintain and use individual object (iObject) data that relates to a unique asset in a family of assets. A tool or GUI for maintaining information that relates to individual objects may be referred to herein as an "individual object workbench" (workbench). In general, a workbench may include a selection area for selecting an individual object to be defined, and a definition area in which a user may define information to be associated with the selected individual object. Each individual object may be associated with one or more unique identifiers (e.g., a particular car is associated with a vehicle identification number, a license plate number, and an order number) of an individual asset throughout that asset's lifecycle, which may span multiple owners, for example.

Using a workbench, a user may display, create, change, and copy individual objects. A user may also maintain attributes for individual objects and attach documents. Accordingly, a workbench may access individual object data stored in a data repository (or electronic database), and may retrieve, modify, and store information to be associated with the individual object data in the same or related data repository or database.

Embodiments may include one or more advantages. For example, information may be defined, associated with an individual object, and maintained by an enterprise to obtain operational efficiencies gained by maintaining individual object databases generally, and by defining information associated with individual objects in particular. The described graphical user interface may provide a convenient, integrated tool for creating, maintaining, displaying, and searching for individual objects and associated information, and for defining relationships between individual objects and other objects that may be stored in a database. The workbench improves information management in enterprise computing systems that integrate individual object data with product, business partner, or other master data. The integration of product and individual object data in a single database object may eliminate redundant data storage and improve data accessibility. As such, an individual object workbench may promote effective utilization of individual object data by providing an easy-to-use interface that an enterprise can self-maintain and adapt over time as events occur during the lifecycle of individual objects.

The details of one or more examples are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF ILLUSTRATIVE EMBODIMENT

A graphical user interface may include display elements that enable a user to maintain individual object (iObject) data in enterprise computing systems. Embodiments of the graphical user interface, referred to herein as a "Workbench," enable a user to create, maintain, and use individual objects and associated data that relate to a unique asset in a family of assets. Using the workbench, a user may maintain individual objects in a simple manner by creating or selecting an individual object and then working through one or more predefined tabbed viewsets.

Each individual object that is stored in a database of an enterprise computing system may represent a uniquely identified product, service, or other tangible or intangible asset. Each individual object may be associated with a unique identifier (e.g., vehicle identification number) to consistently identify that product, service, or asset throughout its life cycle, which may involve multiple owners, for example.

The ability to track assets efficiently throughout their individual life cycles may provide an enterprise with certain competitive advantages, such as improved inventory control, asset tracking, maintenance scheduling, or warranty servicing. In order to take full advantage of individual object data, an enterprise may wish to have a cost-effective tool for developing and maintaining information associated with individual objects. The individual object workbench, and associated computer program products, may be used to efficiently define and associate information with individual objects to improve business processes.

In general, each individual object a) corresponds to a unique asset within an asset family, b) is associated with an object family corresponding to the asset family, c) includes, when first created, a unique identifier value, and d) is capable of being associated with additional attributes and attribute values. As used herein, individual object data generally refers individual objects and stored information, which may include, for example, attribute values, asset family, and object family data that may be associated with an individual object. Such associations may be, for example, stored in a database table to record a defined relationship between stored information objects, such as between an individual object and a unique serial number.

This document introduces the individual object workbench by describing an exemplary graphical user interface. Then, the document discusses how individual object data may be organized to relate to data structures, such as object families, categories, and set types. That discussion is followed by a series of exemplary screen shots that illustrate how the individual object workbench may be used to maintain various individual object data. Finally, the document describes an exemplary computing platform for operating an individual object workbench in an enterprise computing system.

Exemplary Workbench User Interface

Figure 1:
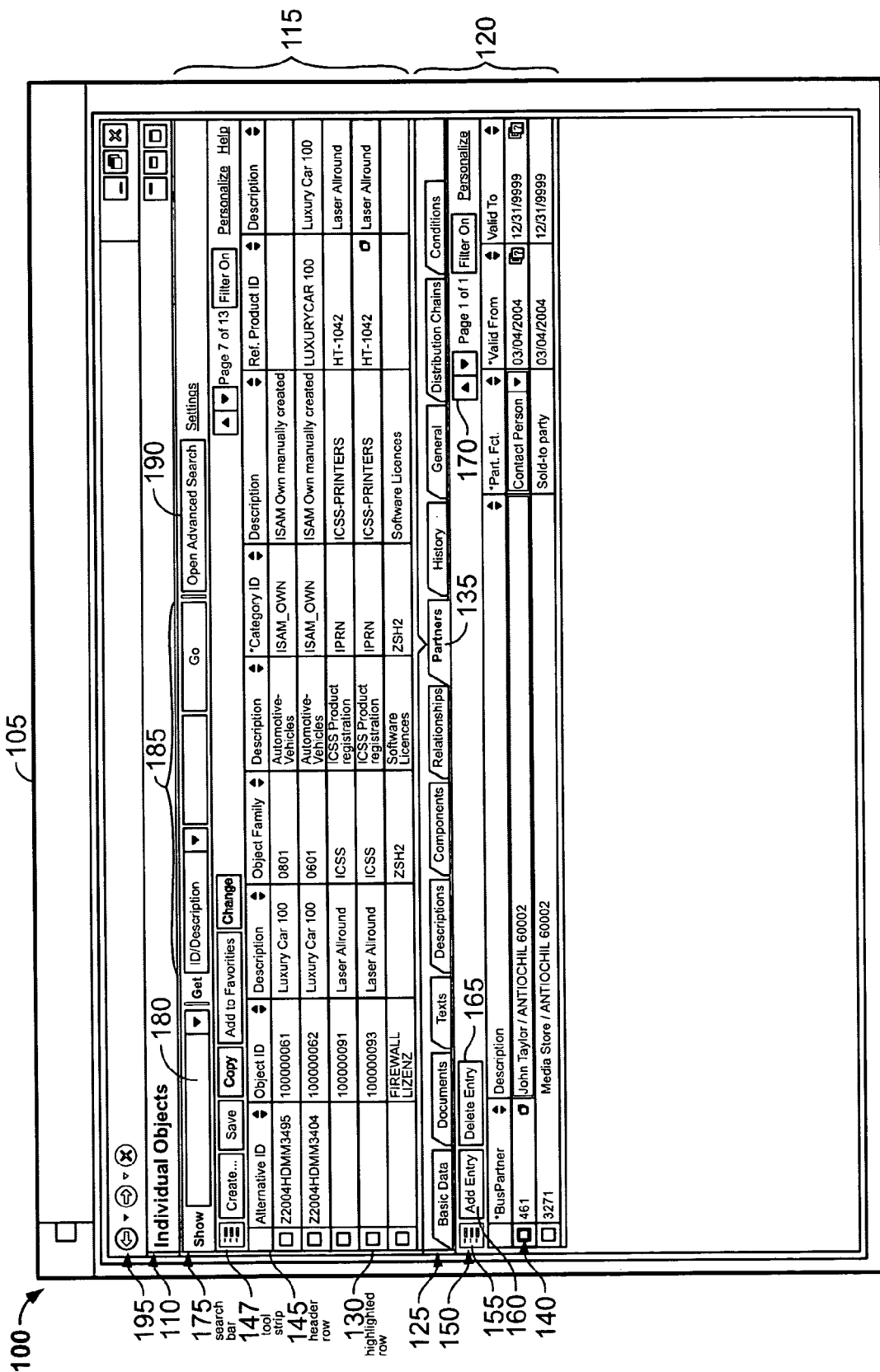
FIG. 1 is a screen shot of an exemplary individual object workbench on a display.

FIG. 1 is a screenshot of an exemplary user interface that embodies an individual object workbench on a display screen 100. On the display screen 100 is a window 105, which may be, for example, a browser or a portal that may be capable of displaying application programs. In this example, the window 105 displays an exemplary user interface for an individual object workbench 110, which is titled "Individual Objects" and is configured to maintain individual object data.

The individual object workbench 110 includes an object selection area 115 in which a user can create or select an individual object to be defined. The individual object workbench 110 also includes a definition area 120 in which the user can define attributes to be associated with the selected individual object. Within the definition area 120, a tab strip 125 is configured to display a number of selectable tabs. When one of the tabs is selected, a viewset containing a number of user input controls may be displayed in the definition area 120.

In this example, a row 130 containing the individual object ID "100000093" is selected in the object selection area 115, and a tab 135 labeled "Partners" is selected in the tab strip 125 in the definition area 120. Accordingly, the definition area 120 displays a viewset of predetermined user input fields that may be viewed or edited by the user. The displayed user input fields in this example include business partner information that is associated with the individual object in the selected row 130. Business partner information is displayed in rows and columns. A row 140 may be selected to enable a user to edit information in any of the several columns in the selected row 140.

The object selection area 115 further includes a header row 145 for displaying titles for the columns of displayed individual object information in the area 115. In some embodiments, the header row 145 includes functionality that allows a pop-up value help menu to be displayed. A pop-up value help menu, or other type of specific search tool, may be designed to aid the user in identifying or searching for individual objects. In some embodiments, the header row may also have functionality that allows the user to sort the rows of displayed individual object data by a specified column, or to sort rows in ascending or descending order, for example.

In this embodiment, the object selection area 115 includes a tool strip 147. The tool strip 147 has user selectable buttons that enable the user to perform operations relating to the displayed individual objects. For example, by selecting a "create" button, the user may create new individual objects in a new row in the area 115. The user may perform other operations, such as saving any changes to the individual object information made by the user within user-editable fields in the area 115. Within the currently-selected row 130, one or more fields may be user-editable. In some embodiments, the ability of the user to edit the fields in the area 115 may be restricted, for example, based on mode of operation or permission access levels assigned to the current user, for example. The tool strip 147 is configured to allow the operations to be performed, such as saving changes to the individual object data, adding an individual object to a favorites list for quick access, and page-scrolling to control which rows of individual objects are displayed in the object selection area 115.

Similar to the object selection area 115, the definition area 120 includes a tool strip 150. The tool strip 150 includes, for example, a display control icon 155, which may be configured, for example, to allow the user to switch quickly between multiple displays of a number of data records. The tool strip 150 also includes selectable buttons 160, 165, which are labeled "Add Entry" and "Delete Entry," respectively. The button 160 allows the user to add a new row in the definition area in order to associate additional information with the selected individual object. The button 165 allows the user to remove a selected row in the definition area to disassociate information from the selected individual object. The tool strip 150 further includes user interface controls, such as scrolling keys to allow the user to control which rows are displayed within the visible screen area provided in the definition area 120.

Several tabs are displayed in the tab strip 125 of this example. Selecting any tab other than the "Partners" tab 135 may cause a different viewset to be displayed in the definition area 120. Each viewset includes a predetermined set of user input controls, which will be described in additional detail below.

In some implementations, an individual product master display allows a user to search for individual objects using various selection criteria. Individual objects that a user wishes to work with on a frequent basis also can be added to a user's favorites list (not shown). The individual objects may later be removed from the favorites list.

In this example, search functionality is provided by a search bar 175. The search bar 175 includes a search input 180 that allows a user to select individual objects to display in the object selection area 115 by picking items from a predetermined list in a drop down list box (DDLB). The predetermined list may include, for example, the most recently displayed individual objects, previously saved individual objects searches, or other predefined criteria.

Alternatively, search inputs 185 and 190 may provide search and advanced search capabilities, respectively. Search input 185 includes, in this example, a drop down list box that may contain a list of searchable parameters from which the user may select. It also includes an input field that accepts user input text to specify a value for the selected search parameter. Finally, it includes an icon labeled "Go" that, when selected, triggers a search in a database for individual objects that correspond to the specified parameter value. For more complex search functionality, the user may opt to use input 190 to open an advanced search window. The input 190 will be described in more detail below with reference to FIG. 8. Accordingly, search inputs 180, 185, or 190 may be used to retrieve individual object information for display in the object selection area 115.

In addition, the window 105 of this embodiment includes a navigation bar 195 that includes a number of icons for operating a web portal or web browser user interface. Such features may be used, for example, to navigate to and to start the application program for the individual object workbench 110.

OIC and ODC View Components

Figure 2:
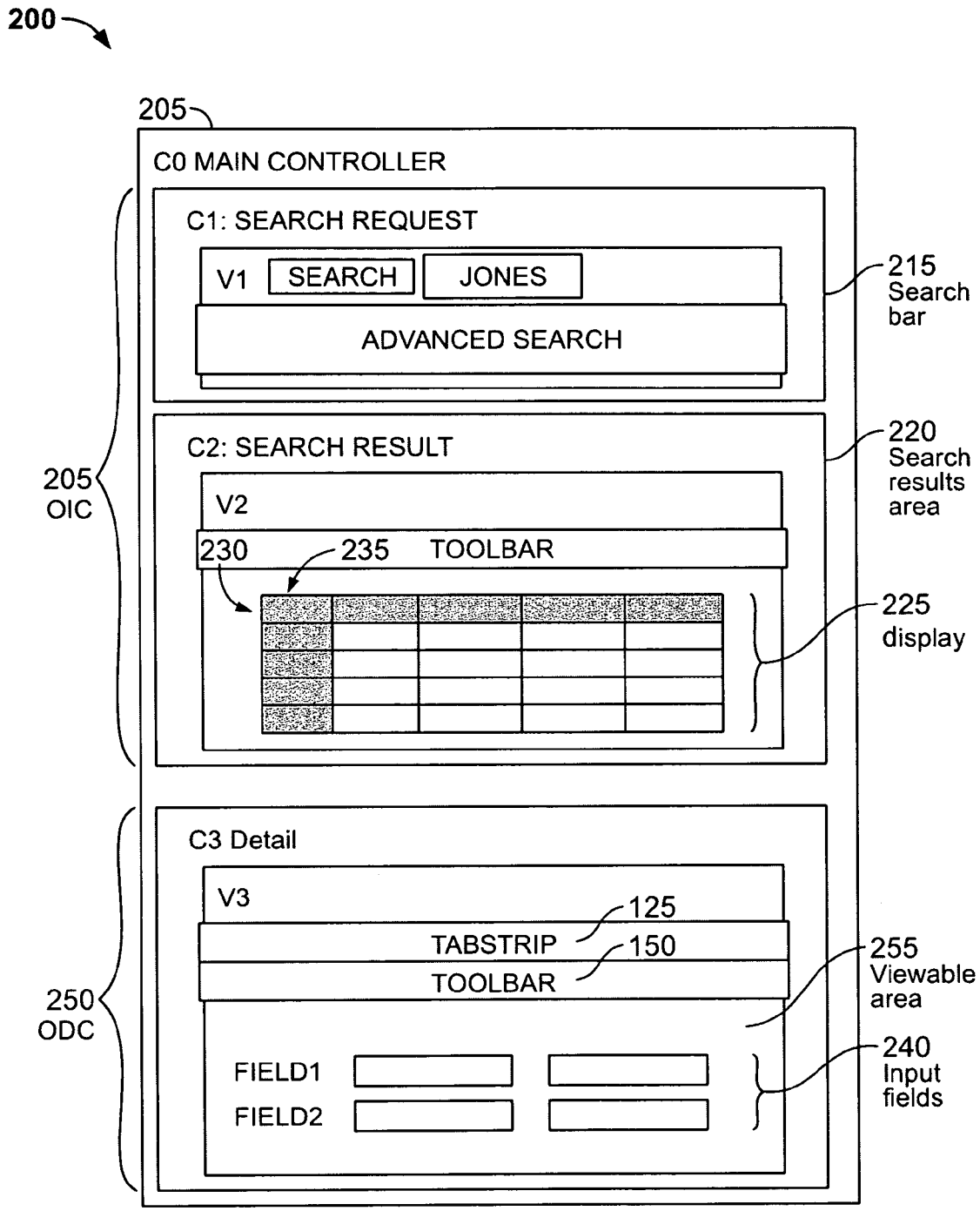
FIG. 2 is a schematic of an exemplary individual object workbench display.

FIG. 2 shows a general representation of two primary view components of a user interface 200 that may include an individual object workbench. The user interface 200 includes an object identification container (OIC) 205 and an object data container (ODC) 250. After a user performs a search or otherwise causes individual objects to be displayed, the OIC 205 displays information associated with an individual object in a search result area 220. With reference to FIG. 1, the OIC 205 corresponds to the object selection area 115, and the ODC 250 corresponds to the definition area 120. Methods for generating such view components have been discussed in U.S. patent application Ser. No. 10/389,713, filed on Mar. 14, 2003, and titled "Retrieving Data For Generating View Components." For purposes of fully describing the invention, this document summarizes relevant aspects of such methods.

The OIC 205 may facilitate searching for and displaying individual objects. The OIC 205 includes, in this example, a search bar 215 and a search result area 220. The search bar 215 includes a text entry field and a button labeled "Search" for executing the search. The search bar 215 also includes an advanced search function that will be described with reference to FIG. 8. The search result area 220 includes a toolbar that corresponds to the tool strip 147 (FIG. 1), and a display 225 of individual objects responsive to the search. The display 225, in this example, is in the form of a spreadsheet display comprising rows 230 and columns 235. By way of example, different objects may be in different rows, and the columns may have different fields for the objects. Thus, the OIC 205 comprises the search bar 215 and the search results area 220.

The search result area 220 may be configured to display the objects in a table 225, although other formats are possible, such as lists grouped by object family. Within the display 225, information associated with an individual object may be displayed in rows 230 and columns 235. In some embodiments, the top one of the rows 230 may display a descriptive title, such as "iObject ID," for the information represented in that column. Rows in the display 225 may be individually selected by the user making an input, such as by clicking with a mouse, or by hitting a designated key on a keyboard, for example. Each row 230 may contain at least one information object, such as "iObject ID," that is uniquely associated with an asset being tracked using individual objects in a database. Accordingly, selecting one of the rows 230 may be referred to as selecting the corresponding individual object.

In general, the ODC 250 displays data that is associated with the individual object that is currently selected in the OIC 205. Information associated with the selected individual object may be displayed in the ODC 250. Selecting a different individual object in the OIC 205 may cause the ODC 250 to change what it is displaying.

The ODC 250 may be organized for quick and efficient display of predefined viewsets that may be accessed through the use of tabs on the tab strip 125. Tab strips may be sets of tabs capable of triggering events that shift a view between its specific instances. Tab strips are often positioned above the toolbar 150, if a toolbar is being displayed. For example, the ODC display 250 is arranged to display the tab strip 125 above the toolbar 150.

In this example, the ODC 250 includes the tab strip 125 that corresponds to the tab strip 125 (FIG. 1) and comprises a row of activatable tabs for selecting different viewsets for display in a viewable area 255. The ODC 250 also includes a tool bar that corresponds to the tool strip 150 (FIG. 1). The viewable area 255 may display a number of pre-configured user input controls 260 in which the user may maintain information associated with the selected individual object. User input controls 260 may include, for example, text-input fields, pop-up value help menus, drop down list boxes, radio buttons, slide controls, or other representation that allow the user to view and/or manipulate the data associated with the selected individual object.

The number and content of the tabs displayed in the tab strip 125 may be determined according to a default configuration, or according to the attributes defined for each tab or the data structures associated with the selected object. For example, if a tab is defined to include one or more attributes that are also associated with the selected object, then that tab may be displayed. According to this example, only relevant tabs are displayed, and the tab area is thereby flexibly configured to display a relevant set of tabs for the selected individual object. For assets associated with different object families, the tab strip 125 may be populated with different tabs.

Within viewable area 255, one or more attributes and associated user input controls 260 may be displayed. In some examples, the attributes may be grouped for display according to their set type (described in detail below with reference to FIG. 3). The user can define attributes for the selected individual object by, for example, using the buttons 160, 165 (FIG. 1) to input attribute values. Attribute values may be entered using any suitable type of user input control, including by way of example, text input fields, drop-down list boxes, radio button list, check boxes, pop-up value help screens, and the like. Examples of some potentially suitable user input controls are discussed in U.S. patent application Ser. No. 10/865,022, filed on Jun. 10, 2004, and titled "User Interface Controls."

In some embodiments, the tab strip 125 may lie along the top border of the definition area 120. In alternative embodiments, the tab strip 125 may lie along the side or bottom borders of the definition area, for example.

In yet another embodiment, a tab strip may be implemented with a "view switch" functionality. This involves replacing a number of related tabs in a tab strip with a drop-down-list box in a toolbar below the tab strip. This offers the advantage of being able to define multiple views within a single tab in a tab strip. For example, assume that a number of tabs are chosen for a tab strip, including the tabs "Basic Data," "Relationships" and "Documents." Including all chosen tabs in the tab strip may make it prohibitively long and thereby render it less useful. A suitable solution may be to replace the three mentioned tabs with a single "Primary Details" tab in the tab strip, for example, and provide a view switch in the toolbar that lists the alternative tabs "Basic Data," "Relationships" and "Documents." In some implementations, the tab strip may have more than one tab enabled.

Individual Objects

Individual objects, or iObjects, have been discussed in U.S. patent application Ser. No. 10/455,224, filed on Jun. 5, 2003, and titled "Individual Data Objects in Enterprise Computing Systems." For purposes of fully describing the invention, this document summarizes relevant aspects of individual objects.

An individual object is a globally unique tangible or intangible object that a company sells and/or provides services for. It is often a specific single unit derived from a product. Unlike a product, however, an individual object can be uniquely identified. This means that although there may be similar objects, at least one attribute describing the object is different. This is generally the identification. A car, for example, generally has its own specific number plate.

Individual objects constitute unique entities and serve as a central reference for transactions between a company and a business partner. They can be objects a company sells or provides services for. A supplier of electricity, for example, can describe the location to which electricity is delivered using individual objects such as 'building' and 'apartment'.

Individual objects may be integrated with the product master data. The product master data provides a source from which object-specific data can be retrieved. Relationships may be created between individual objects and products or objects to represent certain object information. Relationships may relate to, for example, business partners, components, counters, warranties, or qualification requirements. By maintaining the individual object data, individual products may be tracked as they are used in business processes.

Individual object data includes the information required for specific business processes (such as customer inquiries, sales orders, service processes, or contracts), and other basic data that essentially describes and is used to categorize the individual object. For example, data may be of a descriptive nature (e.g., size and weight), or it may have a control function (e.g., the item category group for determining the item category for each item in a CRM order). In some embodiments, the individual object information may be stored in individual product master records. The integration of product and individual object data in a single database object may eliminate redundant data storage and improve data accessibility.

Figure 3:
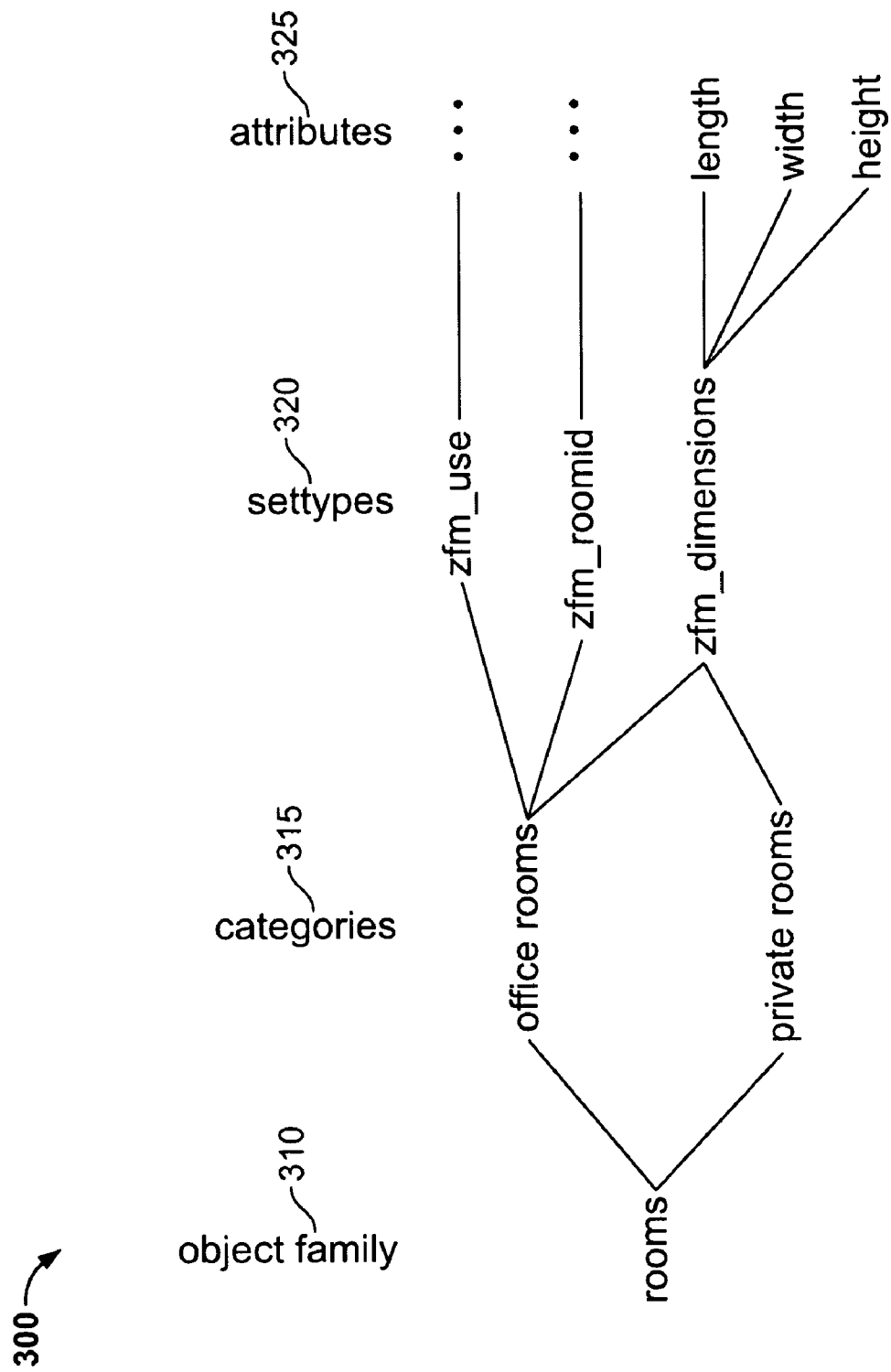
FIG. 3 is a conceptual diagram to illustrate exemplary structural relationships that may be defined between individual objects and associated information.

Exemplary structural relationships that may play a role in defining and maintaining information associated with individual objects are illustrated in FIG. 3. At the highest level of a hierarchy 300 of organizational concepts is an object family 310. Within the object family 310 may be defined one or more categories 315. Each category may be associated with one or more set types 320. Set types 320 may be associated with one or more different categories 315. Each set type 320 may be defined by one or more attributes 325. The individual object workbench may be used to define attribute values for attributes that are associated with a particular individual object.

According to this example, the exemplary object family 310 is defined as "rooms." There are two categories 315 of rooms, namely "office rooms" and "private rooms." Among the three relevant set types 320, "zfm_use" and "zfm_roomid" are defined for the category "office rooms." However, set type "zfm_dimensions" is defined for both categories of "office rooms" and "private rooms." Also shown in FIG. 3 are attributes 325 for the set type "zfm_dimensions." Specifically, the dimension attributes include "length," "width," and "height." For an asset that is tracked as an individual object in the object family 310 of "rooms," a user may use the individual object workbench to define attribute values for the attributes 325 of length, width, and height.

In other embodiments, other structural relationships may be added to fit the needs of a particular application. Relationships that are more complex may be suitable in certain applications. The foregoing example is merely representative of the types of structural relationships that may be used to organize information associated with individual object data.

When an individual object is created, it is typically assigned to a predefined object family. An object family groups together the same types of objects based on the properties of the object.

Categories and hierarchies may be used to structure individual object data into groups according to different criteria. In some implementations, categories define which set types and relationship types are allowed for an individual object, thereby enabling required object information to be structured by assignment of categories. Categories may be arranged in various hierarchies. Lower-level categories may inherit the product type and the set types of the higher-level category. Additional set types may be assigned to lower-level categories.

If a product type (for example, material or service) is assigned to a category, only products/individual objects of this product type can be assigned to the category. Assigning a product type to a category makes it possible to assign set types to the category. In product/individual object maintenance, these set types appear within the views (that is, on the tab pages) that can be maintained for a product/individual object.

To prevent a set type from being assigned to a product/individual object more than once via different categories, the following two rules may be applied when working with categories and hierarchies. First, a set type may be assigned to several categories in a hierarchy; however, a set type may be assigned only in one hierarchy per product type. For example, a set type cannot be assigned to two categories in different hierarchies with the same product type. Nevertheless, this is possible if the product type is different. Second, a product/individual object can be assigned to several categories so long as each category is in a different hierarchy, that is, a product/individual object can be assigned to only one category per hierarchy.

Attributes may be used to describe products/individual objects and are grouped and stored in sets. A set is a specific instance of a set type. A set type is stored in the system as a database table. As an example, to describe a monitor, the set type ZTECHNICALDATA may be created and assigned to predefined attributes ZSCREENDIAGONAL and ZREFRESHFREQUENCY. A possible instance of this set type is the set Monitor with the values 21" and 100 Hz respectively. The use of set types makes it possible to model a product/individual object in the system in a detailed manner.

Certain set types may be predefined, but users may also create customized set types and assign desired attributes to them. Set types may be defined for use in product/individual object maintenance. In certain embodiments, the set type must be assigned to the category to which the product/individual object is subsequently assigned in order for a set type to be allowed for a product/individual object. In product/individual object maintenance, the set types allowed for a product/individual object appears within the viewsets in the definition area 120 (FIG. 1) or the viewable area 255 (FIG. 2), for example.

Creating an Individual Object in the Object Selection Area

Figure 4:
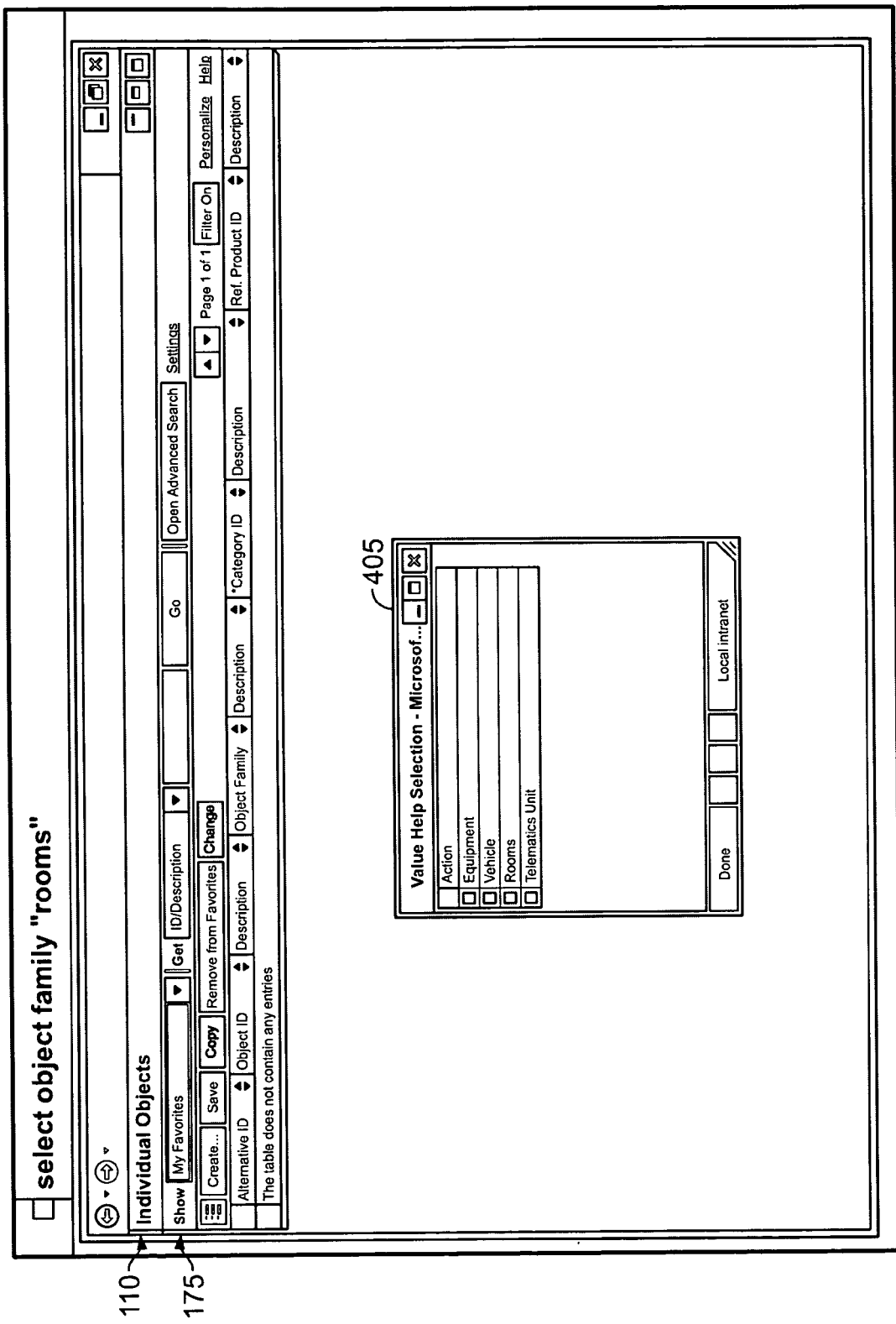
FIGS. 4-8 are screenshots of various run-time screen shots of the individual object workbench.

Next will be described an exemplary sequence of screenshots that illustrate the use and operation of the individual object workbench to maintain and use individual object data. As a first example, FIG. 4 illustrates how a user can operate the workbench to create an individual object. Starting with an unpopulated object selection area 115, the user may create an individual object using available object families 310. In this example, the user selects the "create" button to invoke a value-help menu 405. The value-help menu 405 displays a list 410 of object families 310 from which the user may select.

In some embodiments, a special key function may be defined (e.g., F4) to invoke the pop-up value help menu 405. In alternative implementations, a selectable button may be displayed on the search bar 175 to enable the user to invoke the value help menu 405 by selecting that button with a pointing device (e.g., computer mouse).

Figure 5:
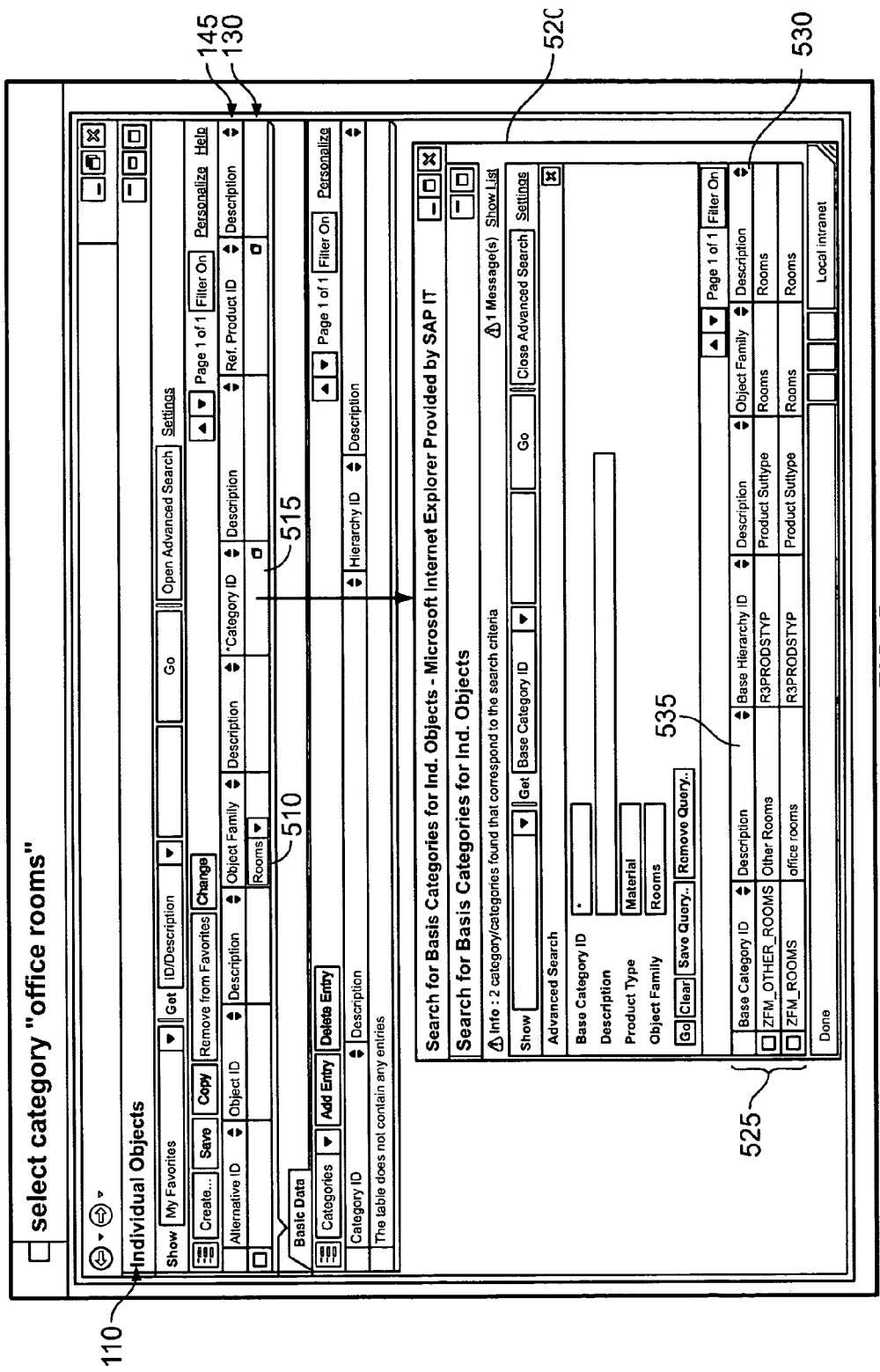

For purposes of this example, the user selects the object family "Rooms" from the list 410. In some embodiments, this causes the menu 405 to close and causes the individual object workbench 110 to display the user interface shown in FIG. 5. In this example, the selected row 130 is populated in the Object Family column 510 with the selected object family "Rooms." Having defined the desired object family to be "rooms," the user next determines the category of interest by first selecting a pop-up window button in the "category id" column 515 in the selected row 130. This invokes a pop-up window 520 that is automatically populated with the previously selected "room" object family in the corresponding input field in the search definition area. Because the object family has already been selected in the pop-up window 520, only categories 315 under that have been defined under the object family 310 are displayed in the area 525. The listed categories are each associated with the Object family "Rooms." A description associated with the object family is displayed for each listed category in the column 530. Similarly, a description associated with each category is displayed in the column 535. As will be seen below, this descriptive information follows the selected category and is transferred to the corresponding column when the user selects the category of interest from the list in the area 525.

Figure 6:
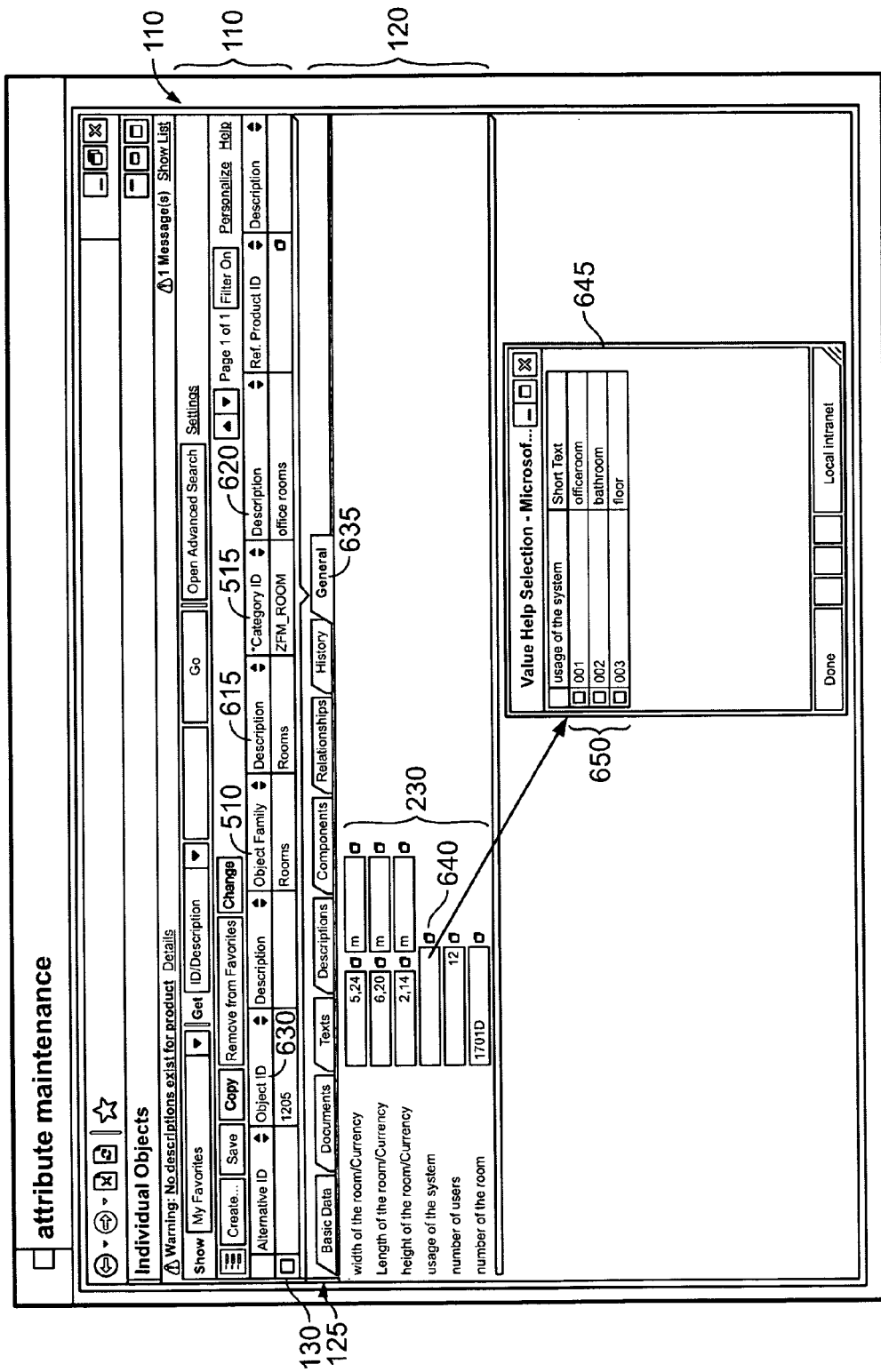

For purposes of this example, the user selects the category "ZFM_ROOM." This causes the pop-up window 520 to close and causes the individual object workbench 110 to display the user interface shown in FIG. 6. The selected row 130 in the object selection area 115 now displays "Rooms" in a description column 615 that is associated with the Object family 510. Moreover, selected row 130 now displays the category "ZFM_ROOM" in the category ID column 515, along with the description "office rooms" in a description column 620 that is associated with the category ID column 515.

For the selected object family and category of this example, only a single individual object has been created in the database. In particular, the individual object is in the "Room" object family 510 and "ZFM_ROOM" (i.e., offices) category 515. This individual object has been assigned an Object ID 630 of "1205." Optionally, the Object ID may be automatically assigned when the individual object is created. In other examples, there may be many thousands of individual objects defined. For example, a real estate property manager may track several thousand rooms in offices, warehouses, or residential buildings.

Using the Definition Area to Define a Selected Individual Object

In this example of FIG. 6, the selected individual object has an Object ID 630 of "1205" in the object selection area 115. The tabbed viewsets in the definition area 120 include the general viewset tab 631, the history viewset tab 632, the relationships viewset tab 633, the components viewset tab 634, the descriptions viewset tab 635, the texts viewset tab 636, the documents viewset tab 637, and the basic data viewset tab 638. Each of these viewset tabs 631-638 in the definition area 120 will now be described in turn.

Returning to the example of FIG. 6, the individual object workbench 110 may be used to maintain attributes associated with the Individual object ID 630 "1206" in the selected row 130. In the definition area 120, the "General" tab 631 in the tab strip 125 is selected. Under the tab strip 125 are displayed several user input fields in the viewable area 255. These user input fields include attribute values for the attributes 325 of set type 320 dimension, which include length, width, and height. In this example, the attribute values have been defined, but are editable by the user. The user may need to edit the dimensions of a room, for example, if the room is remodeled or interior walls are moved.

Another input field displayed in viewable area 255 is for an attribute that relates to the usage of the system (in this case, the room). The user can define this attribute using a user input field 640. In this example, the user selected a pop-up value help menu 645 associated with the input field 640. The pop-up value help menu 645 displays a list 650 of available values for the usage attribute, along with descriptive text as an aid to the user. By selecting one of the available usage values, the user can quickly define the attribute value to be associated with the usage attribute. Upon making the selection, the pop-up value help menu 645 would dose and the selected attribute value Would be transferred into the user input field 640.

Figure 7A:
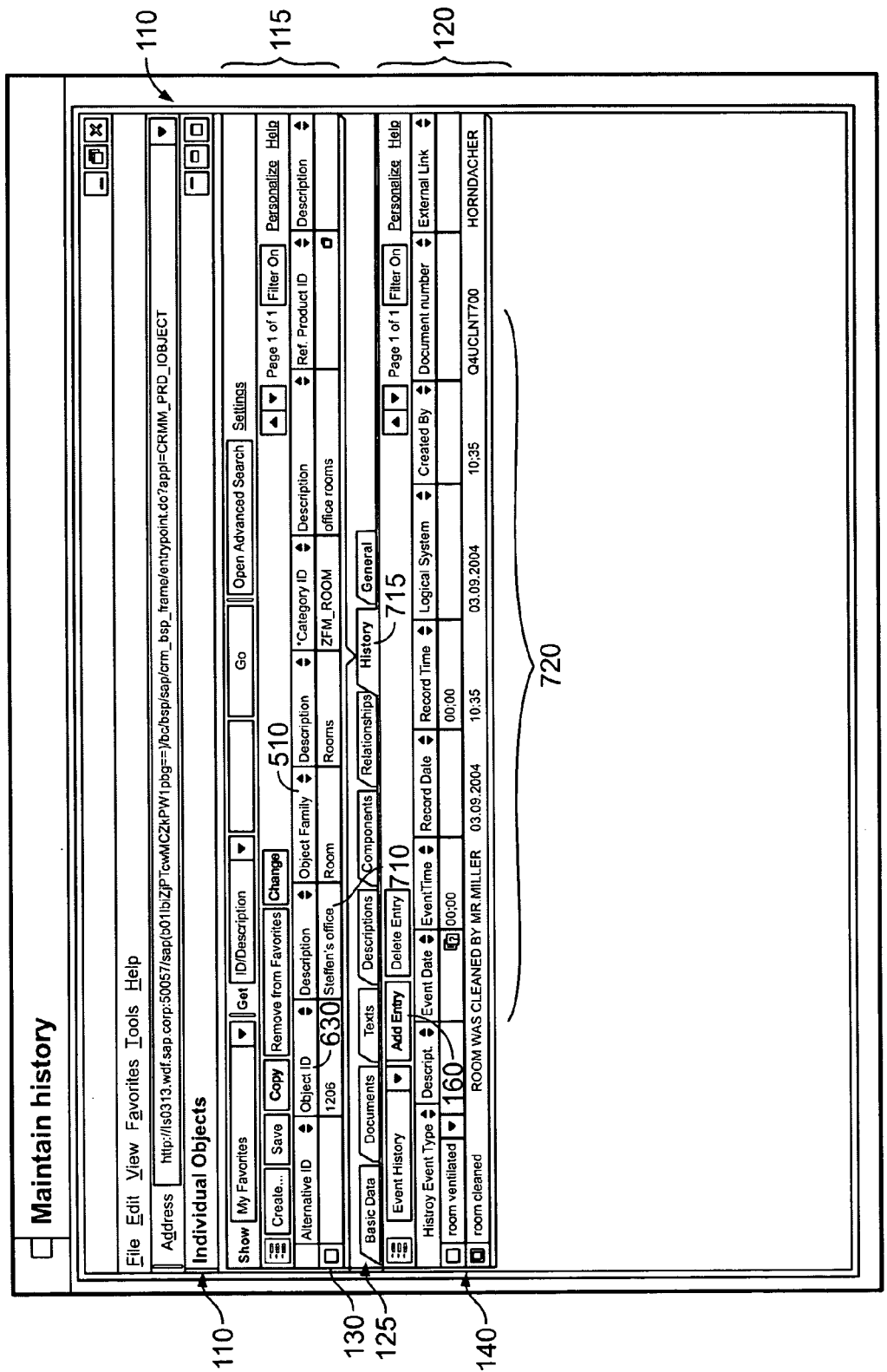

In FIG. 7A, the "History" tab 632 in the tab strip 125 is selected. In this example, the "Object ID" 630 is labeled "1206" and has a "Description" 710 labeled "Steffen's Office." In the toolbar 150, a drop down list box 720 allows the user to select the type of history to be displayed.

In this example, the selected type in the box 720 is labeled "Event History." Accordingly, two historical events and their associated detail information are displayed in two rows in the viewable area 255. In this example, one of the rows is a selected row 140, which is depicted as being currently selected for editing. New historical events may be defined after creating the row 140 using the "Add Entry" button 160. The row 140 indicates that selected individual object in row 130 was ventilated. A second row below the selected row 140 already includes previously defined detail information about an event labeled "room cleaned."

In some embodiments, the History tab 632 may display historical information associated with an individual object with respect to previous events, former business partners, or changed attributes. With respect to events, for example, a user may check when and how often an individual object of type "Vehicle" has been sold, and the names of previous owners. With respect to business partner history, the system may display a list of all the current and previous relationships that business partners have had with a selected individual object. For example, the definition area 120 may display user-editable fields for the dates of the period of validity of a relationship of the vehicle to business partners including a dealer, a service provider, an owner, or a driver. With respect to attribute history, the workbench may display recorded information about all the changes that have been made to the individual object's attributes.

Figure 7B:
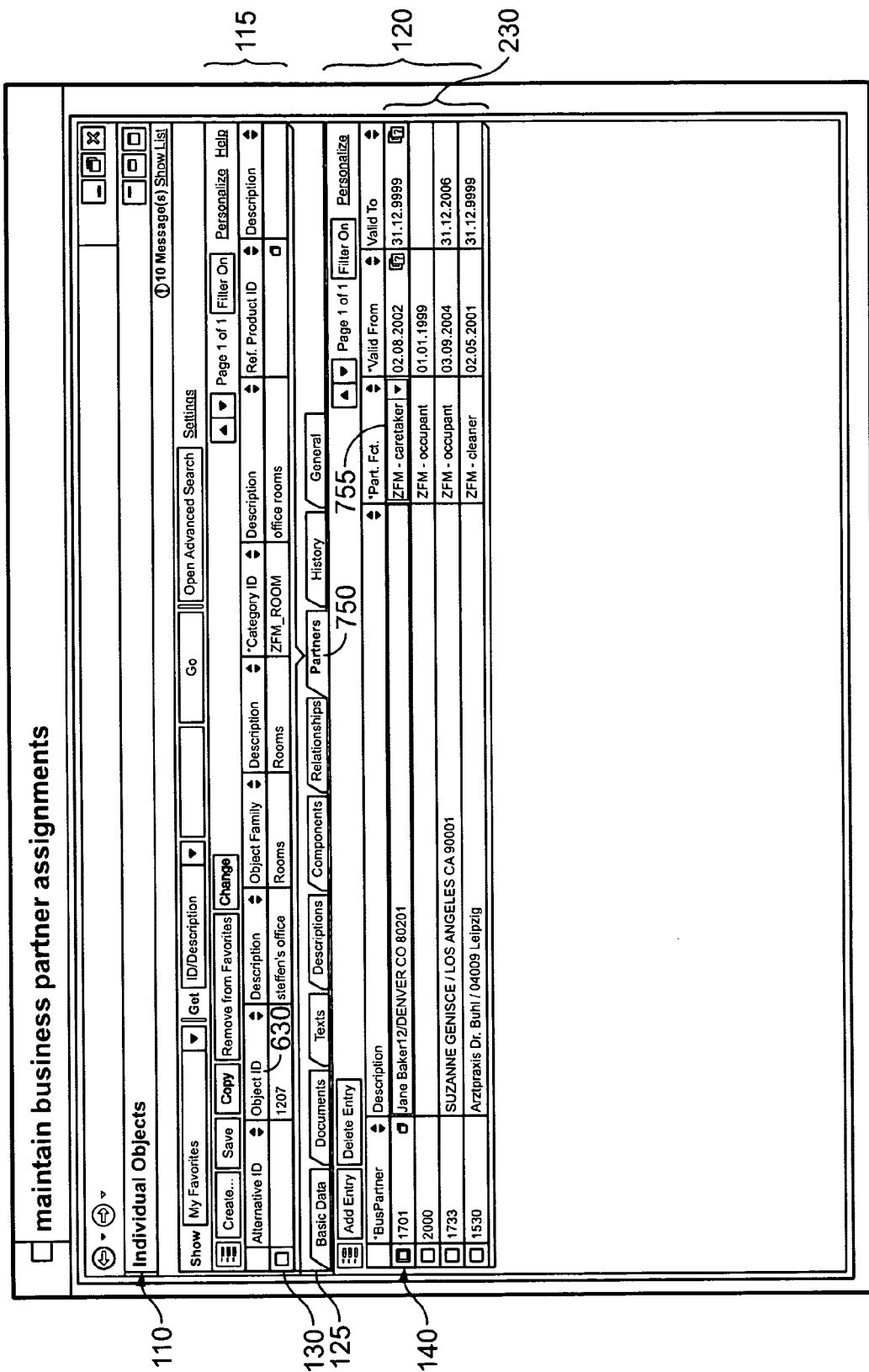

In FIG. 7B, the "Partners" tab 633 in the tab strip 125 is selected. In this example, the viewable area 255 includes four rows of information about partners that are associated with the individual objected selected in the row 130. One of the rows is a selected row 140, which may be highlighted to indicate visually which row is currently available for editing. The row 140 indicates that a business partner "Jane Baker" of "Denver Colo. 80201" has a "caretaker" relationship with the selected individual object in the row 130. The relationship has a valid date range as described by entries in the row 140. Other rows below the selected row 140 already includes previously defined detail information for partners who have or had relationships with the selected individual object as "occupants" or as "cleaner."

Typically, the History tab 632 may display information for business partners who have had some relationship to the selected individual object. In some embodiments, the partner data in the History tab only contains information about partners who have a past relationship (e.g., former owners of a vehicle) with the individual object: partner data for partners with a current relationship (e.g., current owner of a vehicle) may appear in the "Partners" tab 633.

In some embodiments, information about business partners involved in the business transactions of an individual object may be displayed and maintained using the workbench. Examples of business partner data that may be maintained include: assigned business partners; corresponding partner functions; validity period of the relationship; numerator; denominator; and, other attributes, such as the indicator for the main partner.

Several business partners can be assigned to an individual object in different or the same partner functions. A business partner can have several partner functions, and a partner function can have multiple business partners. For example, a car can have a relationship to one business partner with the partner function "Owner," and several relationships to different business partners with the partner function "Driver". The available choices of partner functions displayed in the definition area may be limited to the functions required by a particular user's role.

The percentage proportion of the relationships of an individual object for several partners may be specified using numerators and denominators. For example, a house can belong 51% to partner X, and 49% to partner Y.

Next, tabbed viewsets 634-38 will be briefly described. The tabbed viewset 638 relates to basic data. In addition to the base category already assigned at header level, additional categories from other hierarchies may be assigned to the individual object using basic data. One example of basic data is a tax classification that describes how sales taxes are assigned to an individual object in different countries. For another example, the base unit of measure for some individual objects may be one piece, or it may be gross or net weight, volume, or dimension (length, width, height).

The tabbed viewset 637 relates to documents. This set type may allow various types of documents to be assigned to an individual object and manipulated using content management functionality, for example.

The tabbed viewset 636 relates to texts. Various text types are available in the product master. Each text type can be created once in each language for each individual object. Text types can also be specific to a distribution chain. In that case, they can be created once in, each distribution chain and language for a particular individual object. Text types that are dependent on a distribution chain may be referred to as sales texts.

The tabbed viewset 635 relates to descriptions. A set type may contain the descriptions that have been created for an individual object. Descriptions for an individual object may be created in any language that is defined in the system. When an individual object is created, it may optionally be saved with a description. Descriptions may be referenced from product data associated with the individual object. A description can be maintained in the individual object header in the logon language as well as in the Descriptions set type for all defined languages.

The tabbed viewset 634 relates to components. Components may comprise parts of an individual object. Installed bases (IBases) may be used to structure individual objects.

Alternative Tabbed Viewsets

FIGS. 1, 6, 7A, and 7B illustrate representative examples of tabbed viewsets in the definition area 120 of the individual object workbench 110 that may be used to maintain individual object data with respect to certain types of information. These examples are not exhaustive. The individual object workbench may be configured to include a wide variety of tabbed viewsets in addition to those illustrated or described herein. Next will be described several examples of alternative tabbed viewsets that may also be incorporated into an individual object workbench 110.

One possible tabbed viewset for an individual object workbench relates to distribution chain data that has been created for an individual object for a specific sales organization and distribution channel. All distribution chains assigned to an individual object may be displayed when the tab page is accessed. Various sorts of sales and pricing information associated with individual objects may generally be included in a distribution chain tabbed viewset. Organization-dependent data may be maintained for individual objects on the Distribution Chains tab. After selecting a distribution chain, the sales data can be maintained at the lower tab level on this page. Customer-defined set types may be maintained for individual objects on their own tab pages, corresponding to the views assigned to them in category maintenance. If a set type is organization-dependent, it may be shown on its own tab at the lower level on the Distribution Chains tab page Another possible tabbed viewset for an individual object workbench relates to configurations that enable data objects to be enhanced with characteristics. The configuration model is always associated with a product. The model can be used to define object dependencies with rules for meaningful combinations of values, and to influence price determination. Configurations already available for individual objects may be displayed. In vehicle asset management, for example, characteristics of each vehicle as defined according to a predetermined model may be accessed through such a viewset.

Searching for Individual Objects

Figure 8:
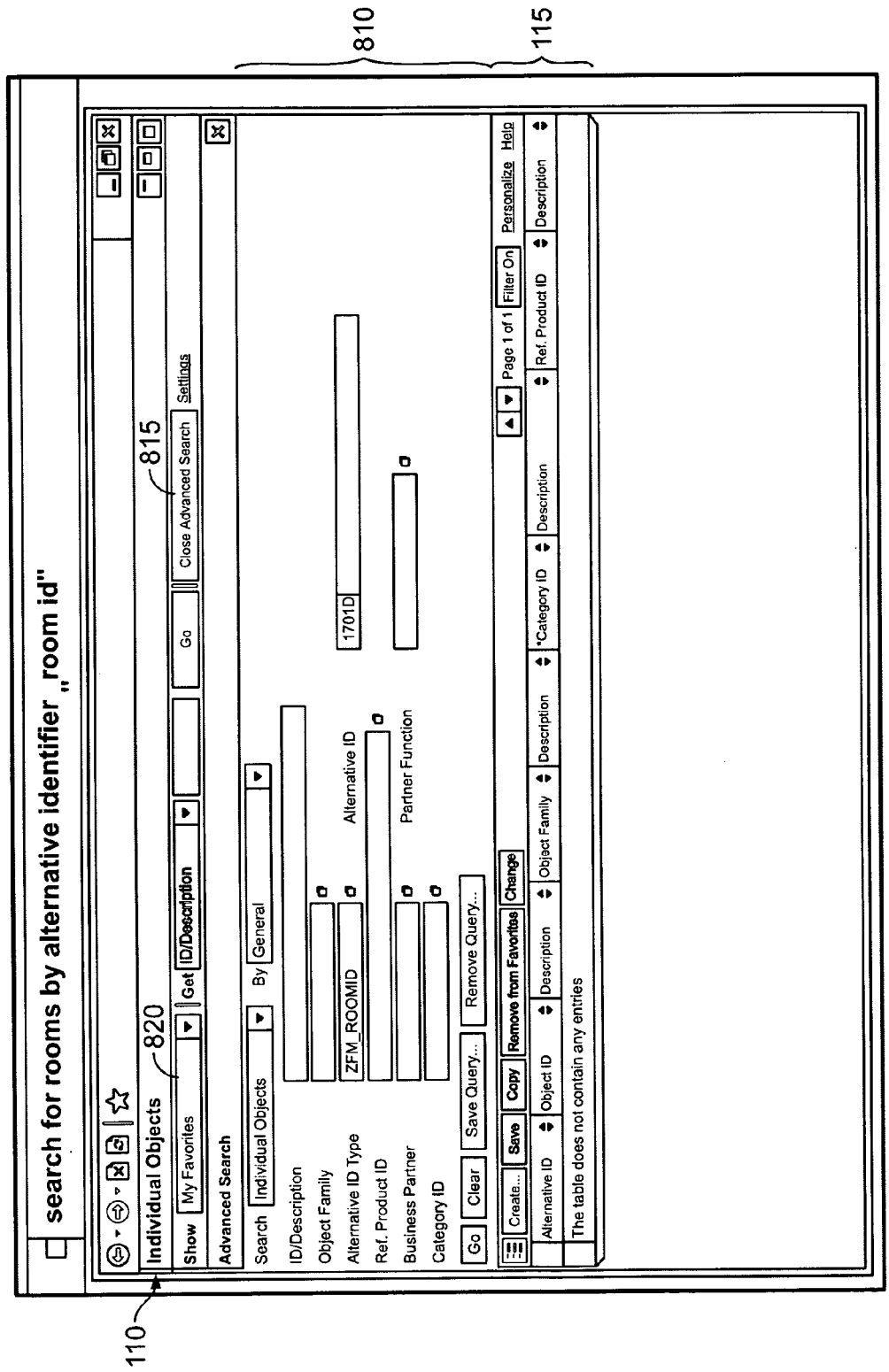

The foregoing discussion illustrates examples of the individual object workbench being used to conveniently enter, modify, and display information about a selected one of the individual objects in the object selection area 115. In FIG. 8, an exemplary GUI is shown that may be displayed in response to selecting the "Open Advanced Search" button 190 in the tool strip 147 (FIG. 1). In one embodiment, this exemplary advanced search user interface provides an efficient and flexible search tool to enable the user to search for information related to individual objects that may be stored within the enterprise computing system.

In one example, the search features may be used to define searches that are based upon one or more attribute values or value ranges associated with individual object data. In other examples, the GUI of FIG. 8 may be used to define searches based on one or more of the following: individual object description, object family, category, set type, or identifiers (e.g., alternative ID's). Alternative ID types can be defined in the product master and used in business processes instead of the individual object ID. As such, alternative IDs enable use of identification, such as vehicle identification number (VIN) or serial number, that conforms to industry standards for various business processes.

Several search functions for retrieving data objects may be incorporated into the OIC 205 architecture (shown in FIG. 2). Some of the search functions described herein are described in U.S. patent application Ser. No. 10/256,968, filed Sep. 27, 2002, and entitled "Database Access Mechanisms for a Computer User Interface."

One way to search for individual objects is to search based on a single selection criterion. Examples of single selection criteria may include: an identifier or description, an alternative identifier, a business partner, or a reference product identifier. The product master may allow for a more advanced search to be performed using a combination of selection criteria, such as: identifiers, descriptions, object families, alternative identifiers, reference product identifiers, business partners, partner functions, and category identifiers. In some implementations, measuring points may also be used to search for individual objects. Measuring points generally refer to a data representations of state measurements associated with an asset or device, such as the temperature of a room, or the number of copies made by a copy machine.

In the example of FIG. 8, the individual object workbench 110 includes the object selection area 115 and an advanced search window 810. The user opens the advanced search window 810 by selecting the open advanced search button 190 (shown in FIG. 1). The open advanced search button 190 automatically changes to a "close advanced search" button 815 while the advanced search window 810 is open. If the user selects the "close advanced search" button 815, then the advanced search window 810 would be closed, and the individual object workbench 110, would return to the configuration of FIG. 1.

In the exemplary individual object workbench 110, the "Advanced" search function may be invoked by pressing the "Advanced" button 190 (FIG. 1) in the search bar 175. In this example, the advanced search area 810 presents a number of user input fields, such as "ID/Description" and "Object Family," in which the user may specify search terms. This allows a search to be circumscribed by several fields at the same time. Moreover, a "Search" drop-down list 825 allows the user to narrow the universe of objects to be searched. Instead of the currently selected "Individual Objects," the user may choose to search other choices that appear in the drop-down list box 825. In addition, the collection of fields is not static. A "by" drop-own list 830 allows the user to select sets of data fields to be displayed in the advanced search area 810. After specifying appropriate search terms, the user may select a "Go" button 835 to execute the search. In this embodiment, the search also includes buttons 840, 845 to save and to remove, respectively, a query that includes the currently specified set of search terms. The user may thereafter dose the advanced search area 810 by selecting the "Close Advanced Search" button 815.

Another way to search for individual objects is to perform a quick search by selecting a "Show" user input control 820. The "Show" user input control button 820 may allow a user to select a predefined search from among a set of predefined searches that may be displayed in the drop-down list box. The user may also add new searches to the Show field 820. Typically, activating a search listed in the Show field 820 initiates a query of a database for objects that match the selected search criteria. The database or data repository may be operatively coupled to provide information to be displayed on the GUI. When the search is complete, a list of the search results may be displayed in the search results area 220. In some implementations, the Show function may incorporate a "My Favorites" list that displays all individual objects that have been associated with a user's favorites list.

Yet another way to search for individual objects is to use alternative identifiers in a quick search function. The particular types of entries needed for the search may depend on user-configurable settings, which may be referred to as customizing settings. When only one identifier type is assigned as a customizing setting, a user need only enter the value of the alternative identifier and need not necessarily also specify the particular type of alternative identifier. In contrast, when more than one identifier type is assigned as a customizing setting, the user may enter both the identifier type and value. In some implementations, the distinction between the identifier type and value may be indicated by a separator, which can be specified in customizing (e.g., as a customizing setting) for each identifier type. For example, a user may search for a vehicle using the vehicle identification number (VIN) by entering VIN:3345*. In such a case, all of the individual objects that pertain to a vehicle will be found in which the vehicle has a VIN that begins with 3345. In some implementations, a user can find out which identifier type(s) are assigned in the advanced search function using the input help on the alternative identifier type field.

Implementation in Computing System

Figure 9:
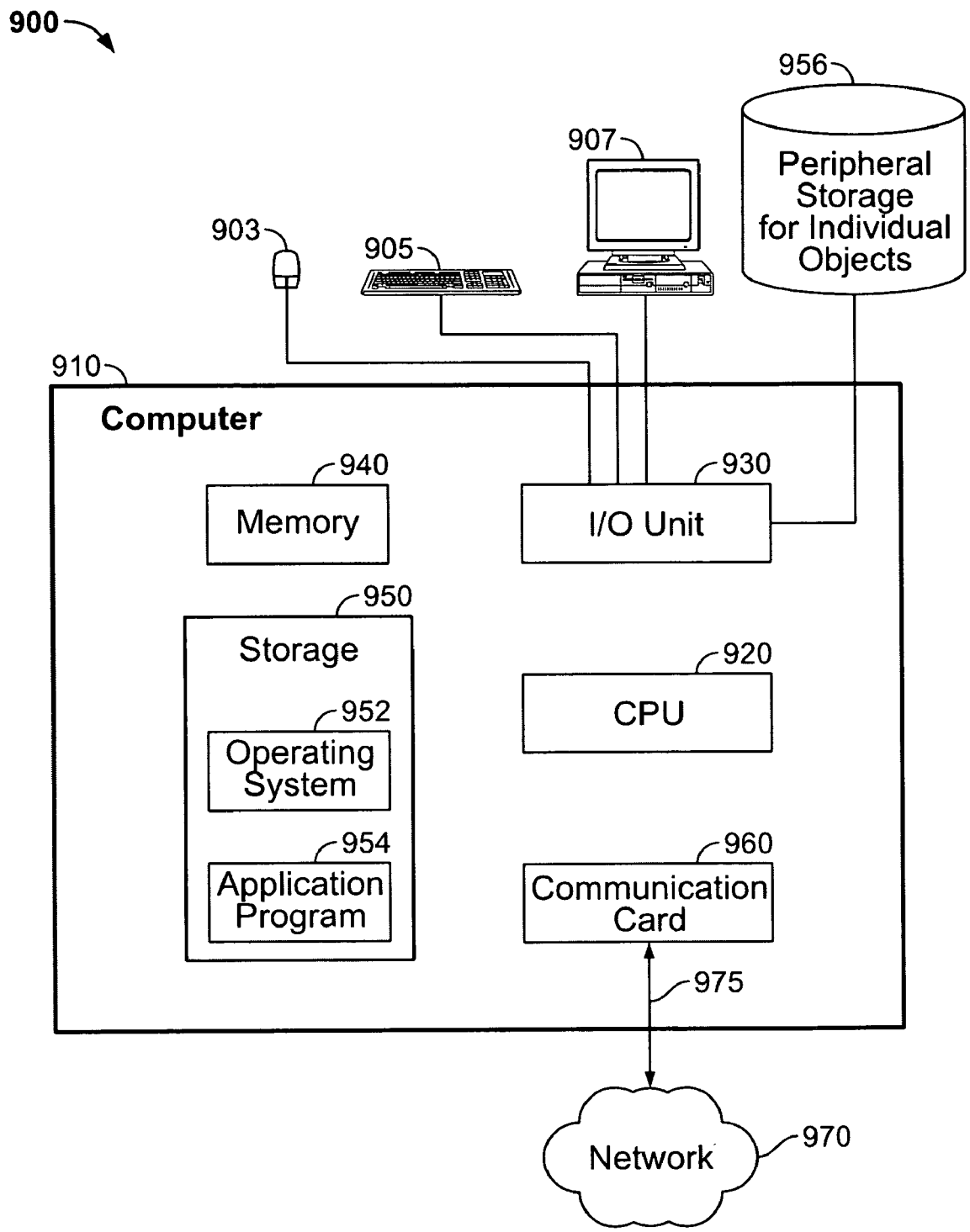
FIG. 9 is an exemplary computer system for operating an individual object workbench.

FIG. 9 shows an exemplary computing system 900 that an enterprise may use to implement an individual object workbench for maintaining information associated with individual objects, as described herein. The computing system 900 may be operated, for example, in an exemplary business application, such as a customer relations management (CRM) system, for example. The computing system 900 may be used to design and run (i.e., execute) embodiments of an individual object workbench.

In this example, the computing system 900 includes a variety of input/output (I/O) devices (e.g., mouse 903, keyboard 905, and display 907) and a computer 910 having a central processor unit (CPU) 920, an I/O unit 930, a memory 940, and a data storage device 950. Data storage device 950 may store machine-executable instructions, data, and various programs, such as an operating system 952 and one or more application programs 954, for implementing a process for creating and modifying individual objects, all of which may be processed by CPU 920. Each computer program may be implemented in a high-level procedural or object-oriented programming language, or in assembly or machine language if desired; and, in any case, the language may be a compiled or interpreted language. Data storage device 950 may be any form of non-volatile memory, including by way of example semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; and Compact Disc Read-Only Memory (CD-ROM).

The computing system 900 may include one or more peripheral online storage devices 956 for storing individual objects. Peripheral online storage device 956 may use any storage media (including magnetic, optical or solid state storage media) or any type of storage device (including, by way of example, a disc drive, a micro drive, a compact disc (CD), a recordable CD (CD-R), a rewriteable CD (CD-RW), a flash memory, or a solid-state floppy disk card (SSFDC)).

The computing system 900 may also include a communications card or device 960 (e.g., a modem and/or a network adapter) for exchanging data with a network 970 using a communications link 975 (e.g., a telephone line, a wireless network link, a wired network link, or a cable network). In other examples, the system 900 may include a handheld device, a workstation, a server, a device, a component, other equipment, or some combination of these capable of responding to and executing instructions in a defined manner. Any of the foregoing may be supplemented by, or incorporated in, ASICs (application-specific integrated circuits).

The invention can also be implemented with digital electronic circuitry, or with computer hardware, firmware, software, or in combinations of them. Apparatus of the invention can be implemented in a computer program product tangibly embodied in a machine-readable storage device for execution by a programmable processor, and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and, in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The techniques described herein for maintaining individual objects using a graphical user interface may be implemented using different data management techniques. For example, some implementations may store various types of master data in a relational database that logically organizes data into a series of database tables. A database table may arrange data associated with a master data object in a series of columns and rows. Each column may describe an attribute of the entity for which data is being stored. Each row may represent a collection of attribute values for a particular entity. Various types of master data also may be stored in an object database that relies on data management technology other than a relational database. Various types of master data also may be stored as XML (Extensible Mark-up Language) documents.

The individual object database or associated master database tables may be updated to reflect the changes made using the individual object workbench 110. The updates, which can include updates in the object selection area 115 or the definition area 120, may be recorded on a data storage device and transferred for long-term storage in the database, for example, whenever the selected row 130 changes, or immediately upon the information being entered into the user input field. In various computing environments, including multiuser environments, various methods, such as caching, may be used to prevent loss of updated information while maintaining individual object database integrity.

Although various examples of the user interface have been described, other implementations are also within the scope of the invention. For example, the object selection area 115 of FIG. 1 may be used to enter and modify information, such as category or object family description data without there being displayed a corresponding definition area 120.

Other implementations may use configurations of the user interface other than those provided in the above-described examples. In FIG. 1, for example, the order and specific definition of columns or input fields displayed in either the object selection area 115 or the definition area 120 may be displayed in different sequences, arrangements, or equivalent configurations to provide the above-described functionalities of defining or maintaining information associated with individual objects.

In other embodiments, the ODC 250 may display information in various configurations. For example, a user interface display may display more than one ODC display 250. In one such embodiment, the individual object workbench 110 may simultaneously display Partners tab information in one portion of the ODC 250, and History tab information in a different portion of the ODC 250. In some embodiments, the arrangement and placement of information in the display may be customizable by the user.

In some implementations, the functions and displays available (such as the information available when a particular tab of a user interface display is selected) may depend on the product type and role with which the user is working.

In one embodiment, a user may operate the workbench to create relationships to business partners using a Partners tab. In some applications, business partners can include persons, organizations, or groups of persons or organizations in which an enterprise has a business interest or relationship. A user also can create relationships between individual objects and products. To do this, the Relationships tab is selected and one of the relationship types in the dropdown list box is selected.

A user may also create an individual object and assign it a reference product. This allows a user to reference the business and technical data related to the individual object. In some implementations, referenced product data can only be displayed (and not modified by the user).

A user may maintain the components for individual objects in the Installed Base (IBase) by choosing the Components tab. Additionally or alternatively, individual objects can also be created directly in the Installed Base.

A user also may maintain organization-dependent data for individual objects. To do so, a user selects a Distribution Chains tab. After selecting a distribution chain, the sales data can be maintained at the lower tab level on that page.

A user also may maintain customer-defined set types for individual objects. In some implementations, the customer-defined set types may be maintained on their own tab pages, corresponding to the views assigned to them in category maintenance. If a set type is organization-dependent, it may be shown on its own tab at the lower level on the Distribution Chains tab page.

In embodiments, the individual object workbench may include a functionality to verify that values of the information being associated with individual objects are within predefined valid ranges. For example, when editing or creating existing partner/product ranges (PPRs) in the sales transaction or application, the individual object workbench may be configured to verify whether the entered combination of business partner, product and time period are within predetermined valid limits.

In various embodiments, the workbench 110 may be reconfigured to display user input fields and ODC 250 windows (refer to FIG. 2), for example, based on the attributes that are associated with the selected individual object. In certain installations, the end user may optionally customize relationships between individual object data and categories, set types, and object families. The end user may configure the workbench to display, for example, all available attribute values in a single ODC window. However, to improve usability for systems with large numbers of potential attributes, the workbench may be configured to display certain attributes in association with predefined viewsets. In such systems, when the user accesses a viewset, only attributes and the corresponding input fields that are associated with that viewset are displayed.

One or more viewsets may be displayed in the definition area at any given time. Where only a limited number of viewsets are displayed, in one embodiment a user can activate and display different viewsets by selecting appropriate links. In the definition area 120, a number of tabs provide selectable links. When selected, these links may cause the workbench 110 to display various fields related to a user-selected individual object in the object selection area 115.

In some examples, individual objects may represent a configurable item whose configuration changes over the lifecycle of the item. The item may be a product such as an automobile or a service, for example. The information received from the computer system may explicitly identify the triggering event, or it may do so implicitly. The individual object attributes may include an identifier that uniquely identifies an item corresponding to the particular uniquely defined individual object. The unique identifier may be, for example, a vehicle identification number for an automobile. Possible triggering events may include a data request, for example. The integration may further comprise a state manager adapter that interfaces the event manager with the state manager, which may be part of the integration system or alternatively may be in an external system called by the integration system. The state manager may include a state machine engine, and may include a repository of allowable states for individual data objects and a repository of allowable transitions between states. Upon execution of the action on the individual object, a data container may be populated with context data from the identified individual object.

In one example, individual data objects may be provided in an enterprise computing system, where the individual data objects represent unique assets of a family of assets. The individual data objects may be used in addition to business partner master data, and also in some cases in addition to generic product master data. Thus, the enterprise computing system may enable the modeling of business processes centrally around uniquely defined individual objects, while still retaining the advantages of a customer, or business partner, focused system. Such modeling is particularly useful for certain types of assets, such as assets that are highly configurable, have a high value, or have a long and complex lifecycle.

In another example, individual data objects may be processed in a computer system that includes a data repository for individual objects. Each individual object pertains to a unique asset within an asset family, is associated with an object family corresponding to the asset family, and includes, when first created, a unique identifier value, and capable of including additional attributes and attribute values. The computer system may also have an executable software module that adds attributes to an individual object based on user input, and that associates an attribute value with each added attribute.

In various implementations, the computer system may have one or more of the following features. The object family may identify the attributes that are permitted to be added to each individual object associated with the object family, and the executable software module may only add an attribute to an individual object when the attribute is identified by the object family as a permitted attribute. Each individual object in the data repository may include an attribute value for each attribute of the individual object. The asset that an individual data object represents may be, for example, a tangible or intangible product, or a service.

Individual objects may be stored in a data repository. Each individual object in the repository is associated with an object family and has a unique identifier attribute and attributes that are common with other individual objects that are associated with the same object family to which the object is associated. Each such attribute has a corresponding attribute value.

Each individual object in the repository pertains to a unique asset within an asset family. Additional attributes may be added to each individual object, for example, in response to a temporal event having an impact on the unique asset to which the individual object pertains, and an attribute value may be associated with each added attribute. The repository may include asset information, information for a product, information for a service, and information for an intangible product. The repository may also include business partner information, with each individual object being capable of being associated with a business partner. Also, each individual object may be capable of 1) including configuration information for the individual object, 2) being associated with history information for the individual object, 3) having location information for the geographical location of the individual object, and/or 4) being associated with calendar information that includes dates and tasks, each task being associated with a particular date.

In another example, a data repository may store product master data, business partner master data, and individual objects. The product master data may include product master records. Each product master record may be associated with a particular type of product. The business partner master data may include business partner master records. Each business partner master record may be associated with a particular business partner. As for the individual objects, each individual object a) pertains to a unique asset within an asset family, b) is associated with an object family corresponding to the asset family, c) includes, when first created, a unique identifier and attributes, each attribute being associated with an attribute value, and d) is associated with a particular product master record and a particular business partner master record. Additional attributes are added to an individual object in response to a temporal event having an impact on the asset to which the individual object pertains, and attribute values are associated with each added attribute.

The invention has been described in terms of particular examples. Other examples are within the scope of the following claims.

What is claimed is:

1. A computer program product (CPP) tangibly embodied in a machine-readable storage device, the CPP including instructions that, when executed by a processor, generate on a display device a graphical user interface (GUI) for defining attributes associated with an individual object stored in a data repository for a customer relationship management application that stores product master data, business partner master data, and individual objects, the GUI comprising:

an object selection area in which an individual object to be defined is selected, the selected individual object representing a unique tangible asset whose attributes and business partner relationships change, in response to temporal events, over a lifecycle of the unique tangible asset; and a definition area that displays user input fields which are used to define attributes to be associated with the selected individual object, wherein each individual object comprises data that a) corresponds to a unique asset within an asset family, b) is associated with an object family corresponding to the asset family, c) includes, when first created, a unique identifier value, and d) is associated with a particular product master record and a particular business partner master record, wherein the selected individual object is associated with a first product master record and a first business partner master record that identifies a first business partner that has a type of relationship with the unique tangible asset;

wherein the definition area includes a tabstrip that includes activatable tabs for selecting different views of attributes associated with the selected individual object, the activatable tabs correspond to types of attributes defined by the object family of the selected individual object, are configured to cause display of attributes of the corresponding type when activated, and are dynamically defined based on the object family of the selected individual object such that a first set of activatable tabs included in the tabstrip for a first object family are different than a second set of activatable tabs included in the tabstrip for a second object family when the second object family is different than the first object family, wherein, when an additional business partner attribute is added to the selected individual object in response to a change in business partner, from the first business partner to a second business partner that is different than the first business partner, for the type of relationship with the unique tangible asset, a representation of the additional business partner attribute is displayed in a view associated with and selected by an activatable tab that corresponds to business partners added to the selected individual object and the first business partner is displayed as having a previous relationship with the unique tangible asset for the type of relationship, wherein attributes and corresponding attribute values are added to the individual object in response to temporal events having an impact on the unique tangible asset to which the individual object pertains, and wherein the GUI is adapted over time as events occur during the lifecycle of the selected individual object.

2. The CPP of claim 1, wherein individual objects are retrieved from a database for display in the object selection area in response to user input in one or more user input fields displayed in the object selection area.

3. The CPP of claim 2, wherein the selected individual object is selected from among one or more individual objects being displayed in the object selection area.

4. The CPP of claim 1, wherein the definition area further displays a plurality of user-selectable links, each link corresponding to a viewset, such that in response to user selection of one of the links, attribute information associated with the selected individual object is sent for display in the viewset corresponding to the selected link.

5. The CPP of claim 4, wherein at least one of the user-selectable links corresponds to a viewset that displays stored information that describes historical events associated with the selected individual object.

6. The CPP of claim 5, wherein the described historical events include information about transactions involving the selected individual object.

7. The CPP of claim 4, wherein one of the user-selectable links corresponds to a viewset that displays user input fields that receive user input to define one or more attributes related to historical events associated with the selected individual object.

8. The CPP of claim 4, wherein one of the user-selectable links corresponds to a viewset that displays user input fields that receive user input to define one or more attributes related to business partners associated with the selected individual object.

9. The CPP of claim 1, wherein:

the object family identifies the attributes that are permitted to be added to each individual object associated with the object family, and the user input fields in the definition area are configured to allow an attribute to be defined in association with the selected individual object only if the object family identifies the attribute as a permitted attribute.

10. The CPP of claim 1, wherein each individual object in the data repository includes an attribute value for each attribute of the individual object.

11. The CPP of claim 1, wherein the unique asset comprises a product.

12. The CPP of claim 1, wherein the unique asset comprises a service.

13. The CPP of claim 1, wherein the stored information is stored in a plurality of memory locations in an enterprise computing system.

14. The CPP of claim 1, wherein, in response to a predetermined user input, the GUI further comprises a search area for receiving user input that defines search criteria for searching for information associated with individual object data.

15. The CPP of claim 1, the GUI further comprising one or more user input controls configured to receive user input to create an individual object.

16. A method of defining attributes that are associated with individual objects, the method comprising:

inputting attribute information into user input fields displayed in a definition area of a graphical user interface (GUI) being displayed on a display device, the attribute information pertaining to a selected individual object being displayed in an object selection area, wherein the selected individual object comprises data that a) corresponds to a unique asset within an asset family, b) is associated with an object family corresponding to the asset family, c) includes, when first created, a unique identifier value, and d) is associated with a particular product master record and a particular business partner master record, the selected individual object representing a unique tangible asset whose attributes and business partner relationships change, in response to temporal events, over a lifecycle of the unique tangible asset, wherein the selected individual object is associated with a first product master record and a first business partner master record that identifies a first business partner that has a type of relationship with the unique tangible asset;

wherein the definition area includes a tabstrip that includes activatable tabs for selecting different views of attributes associated with the selected individual object, the activatable tabs correspond to types of attributes defined by the object family of the selected individual object, are configured to cause display of attributes of the corresponding type when activated, and are dynamically defined based on the object family of the selected individual object such that a first set of activatable tabs included in the tabstrip for a first object family are different than a second set of activatable tabs included in the tabstrip for a second object family when the second object family is different than the first object family, wherein, when an additional business partner attribute is added to the selected individual object in response to a change in business partner, from the first business partner to a second business partner that is different than the first business partner, for the type of relationship with the unique tangible asset, a representation of the additional business partner attribute is displayed in a view associated with and selected by an activatable tab that corresponds to business partners added to the selected individual object and the first business partner is displayed as having a previous relationship with the unique tangible asset for the type of relationship;

wherein the GUI is adapted over time as events occur during the lifecycle of the selected individual object; and retrieving individual objects from a database for display in the object selection area in response to user input in one or more user input fields displayed in the object selection area.

17. The CPP of claim 1, wherein a representation of the additional business partner attribute is displayed, with a representation of the first business partner, in a business partner history area that lists current and previous relationships that business partners have had with the selected individual object.

18. A computer program product (CPP) tangibly embodied in a machine-readable storage device, the CPP including instructions that, when executed by a computer, cause the computer to perform operations comprising:

displaying an object selection area in which an individual object to be defined is selected, the selected individual object representing a unique tangible asset whose attributes and business partner relationships change, in response to temporal events, over a lifecycle of the unique tangible asset;

displaying a definition area that displays user input fields which are used to define attributes to be associated with the selected individual object, wherein each individual object comprises data that a) corresponds to a unique asset within an asset family, b) is associated with an object family corresponding to the asset family, c) includes, when first created, a unique identifier value, and d) is associated with a particular product master record and a particular business partner master record, and wherein the selected individual object is associated with a first product master record and a first business partner master record that identifies a first business partner that has a type of relationship with the unique tangible asset:

displaying a tabstrip that includes activatable tabs for selecting different views of attributes associated with the selected individual object, the activatable tabs correspond to types of attributes defined by the object family of the selected individual object, are configured to cause display of attributes of the corresponding type when activated, and are dynamically defined based on the object family of the selected individual object such that a first set of activatable tabs included in the tabstrip for a first object family are different than a second set of activatable tabs included in the tabstrip for a second object family when the second object family is different than the first object family;

displaying, when an additional business partner attribute is added to the selected individual object in response to a change in business partner, from the first business partner to a second business partner that is different than the first business partner, for the type of relationship with the unique tangible asset, a representation of the additional business partner attribute in a view associated with and selected by an activatable tab that corresponds to business partners added to the selected individual object and the first business partner is displayed as having a previous relationship with the unique tangible asset for the type of relationship; and adapting the definition area over time as events occur during the lifecycle of the selected individual object, wherein attributes and corresponding attribute values are added to the individual object in response to temporal events having an impact on the unique tangible asset to which the individual object pertains.

19. The CPP of claim 18 wherein the operations further comprise identifying a triggering event that results in a change in configuration of the item.

20. The CPP of claim 18 wherein identifying a triggering event that results in a change in configuration of the item comprises using a repository of allowable states for the selected individual data object and allowable transitions between states for the selected individual data object to update a state of the selected individual data object based on the triggering event.

* * * * *